United States Patent
Chen et al.

(10) Patent No.: US 12,216,745 B2
(45) Date of Patent: Feb. 4, 2025

(54) TWO-SIDED MACHINE LEARNING FRAMEWORK FOR POINTER MOVEMENT-BASED BOT DETECTION

(71) Applicant: PAYPAL, INC., San Jose, CA (US)

(72) Inventors: Zhe Chen, Singapore (SG); Jiyi Zhang, Singapore (SG); Hewen Wang, Singapore (SG); Panpan Qi, Singapore (SG); Quan Jin Ferdinand Tang, Singapore (SG); Solomon kok how Teo, Singapore (SG); Yuzhen Zhuo, Singapore (SG); Mandar Ganaba Gaonkar, Fremont, CA (US); Fei Pei, San Jose, CA (US); Omkumar Mahalingam, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 213 days.

(21) Appl. No.: 18/146,738

(22) Filed: Dec. 27, 2022

(65) Prior Publication Data
US 2024/0211559 A1 Jun. 27, 2024

(51) Int. Cl.
G06F 21/31 (2013.01)
G06F 21/32 (2013.01)

(52) U.S. Cl.
CPC ............ G06F 21/316 (2013.01); G06F 21/32 (2013.01)

(58) Field of Classification Search
CPC .............................. G06F 21/316; G06F 21/32
See application file for complete search history.

(56) References Cited

U.S. PATENT DOCUMENTS

| | | | | |
|---|---|---|---|---|
| 2012/0323700 | A1* | 12/2012 | Aleksandrovich | G06F 21/36 705/14.69 |
| 2017/0054702 | A1* | 2/2017 | Turgeman | G06F 21/31 |
| 2017/0318008 | A1* | 11/2017 | Mead | H04L 63/083 |
| 2018/0314816 | A1* | 11/2018 | Turgeman | G06F 21/40 |
| 2019/0334903 | A1* | 10/2019 | Lerner | H04L 63/10 |
| 2020/0045066 | A1* | 2/2020 | Meng | H04L 63/1416 |
| 2023/0259943 | A1* | 8/2023 | Chen | G06Q 20/40145 705/75 |

OTHER PUBLICATIONS

Azad et al. 2020. Web Runner 2049: Evaluating Third-Party Anti-Bot Services. In DIMVA. Springer-Verlag, 135-159.

(Continued)

*Primary Examiner* — Chau Le
(74) *Attorney, Agent, or Firm* — Haynes and Boone, LLP

(57) ABSTRACT

Methods and systems are presented for bot detection. A movement of a pointing device is tracked via a graphical user interface (GUI) of an application executable at a user device. Movement data associated with different locations of the pointing device within the GUI is obtained. The movement data is mapped to functional areas corresponding to a range of the different locations of the pointing device within the GUI over consecutive time intervals. At least one vector representing a sequence of movements for at least one trajectory of the pointing device through one or more of the functional areas and a duration the pointing device stays within each functional area is generated. At least one trained machine learning model is used to determine whether the sequence of movements of the pointing device was produced through human interaction with the pointing device by an actual user of the user device.

20 Claims, 9 Drawing Sheets

(56) References Cited

OTHER PUBLICATIONS

Carlini et al. 2017. Towards evaluating the robustness of neural networks. In 2017 IEEE Symposium on Security and Privacy (S&P). IEEE, 39-57.

Chen et al. 2018. Ead: elastic-net attacks to deep neural networks via adversarial examples. In Thirty-second AAAI conference on artificial intelligence.

Goodfellow et al. 2014. Explaining and harnessing adversarial examples. arXiv preprint arXiv:1412.6572 (2014).

Howard et al. 2017. MobileNets: Efficient Convolutional Neural Networks for Mobile Vision Applications. CoRR abs/1704.04861 (2017). arXiv:1704.04861 http://arxiv.org/abs/1704.04861.

Kurakin et al. 2016. Adversarial machine learning at scale. arXiv preprint arXiv:1611.01236 (2016).

Meeds. 2015. MLitB: machine learning in the browser. PeerJ Computer Science 1 (2015), e11.

Moosavi-Dezfooli et al. 2016. Deepfool: a simple and accurate method to fool deep neural networks. In Proceedings of the IEEE Conference on Computer Vision and Pattern Recognition. 2574-2582.

Osterweil. 2019. 20 Years of DDoS: a Call to Action. CoRR abs/1904.02739 (2019). arXiv:1904.02739 http://arxiv.org/abs/1904.02739.

Papernot et al. 2016. The limitations of deep learning in adversarial settings. In 2016 IEEE European Symposium on Security and Privacy (EuroS&P). IEEE, 372-387.

Smilkov et al. TensorFlow.js: Machine Learning For The Web and Beyond. In Proceedings of Machine Learning and Systems 2019, MLSys 2019, Stanford, CA, USA, Mar. 31-Apr. 2, 2019, Ameet Talwalkar, Virginia Smith, and Matei Zaharia (Eds.). mlsys.org. https://proceedings.mlsys.org/book/264.pdf.

* cited by examiner

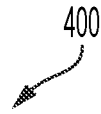

Algorithm 1 FA Convolution

1: procedure CONVOLUTION PROCESS ON OUTPUT VECTOR
2:     $v \leftarrow$ output vector
3:     $n \leftarrow$ total number of Functional Areas
4:     $m_x, m_y \leftarrow$ largest coordinates of X,Y axis
5:     $w_x \leftarrow$ width of Functional Area
6:     for $k$ in 0 to $n-1$:
7:         if $(k * w_x) \% m_x == 0$ then
8:             $cu = k - m_x / w_x$
9:             $cd = k + m_x / w_x$
10:            $cr = k + 1$
11:            $v_k += v_{cu} + v_{cd} + v_{cr}$
12:         else if $(k * w_x) \% m_x == m_x - w_x$ then
13:             $cu = k - m_x / w_x$
14:             $cd = k + m_x / w_x$
15:             $cl = k - 1$
16:             $v_k += v_{cu} + v_{cd} + v_{cl}$
17:         else
18:             $cu = k - m_x / w_x$
19:             $cd = k + m_x / w_x$
20:             $cl = k - 1$
21:             $cr = k + 1$
22:             $v_k += v_{cu} + v_{cd} + v_{cl} + v_{cr}$
23:     return $v$     ▷ This is the updated feature FA_Conv

FIG. 4

TWO-SIDED MACHINE LEARNING FRAMEWORK FOR POINTER MOVEMENT-BASED BOT DETECTION

TECHNICAL FIELD

The present application generally relates to fraud detection, and particularly, to machine-learning based detection of fraudulent interactions and impersonations of users by Internet bots.

BACKGROUND

Fraud prevention is an important component of an online service provider's risk management system. Amongst the different types of frauds, security breaches resulting from the improper access of a service provider's website through automated processes (commonly referred to as "bots") are becoming more commonplace. Research has shown that bot activities account for more than half of all Internet traffic. While bot detection remains a popular research topic, few bot detection solutions have been applied to real-time production environments. Conventional bot detection solutions can generally be divided into two major categories: explicit detection and implicit detection.

Explicit detection provides an interface where a user must complete a challenge which differentiates bots and human beings. The "reCAPTCHA" service from Google LLC of Mountain View, California is the most well-known example of such an explicit detection tool. While explicit detection has proven to be useful, it also comes with various limitations. The challenge to differentiate human beings and bots adds an additional step for legitimate users to access a website and injects hurdles to the user experience. In addition, the challenges used are often based on heuristics, as there is no theoretical proof for what a machine cannot achieve. Therefore, website operators often must come up with new challenges and continually upgrade the detection service as bots become more powerful and sophisticated (especially given the recent advancements in neural networks).

Implicit detection aims to present the challenge in a "silent" manner to create a more seamless user experience. For example, an implicit detection service may assign a rating (e.g., from 1 to 99) to a request for website access from a user's device to determine how likely the request comes from a bot. However, such detection is typically conducted at the network or transport layer. While it could effectively mitigate the risk of certain types of attacks by bots, e.g., distributed denial-of-service (DDoS) attacks, it is not designed for more complicated bots that imitate user behavior at the application layer.

BRIEF DESCRIPTION OF THE DRAWINGS

The accompanying drawings, which are included to provide further understanding and are incorporated in and constitute a part of this specification, illustrate disclosed embodiments and, together with the description, serve to explain the principles of the disclosed embodiments. In the drawings:

FIG. 4 is an algorithm for generating at least one feature representation of pointer movement data, in accordance with one or more embodiments of the present disclosure;

It should be appreciated that like reference numerals are used to identify like elements illustrated in one or more of the figures, wherein showings therein are for purposes of illustrating implementations of the present disclosure and not for purposes of limiting the same.

DETAILED DESCRIPTION

Figure 1:
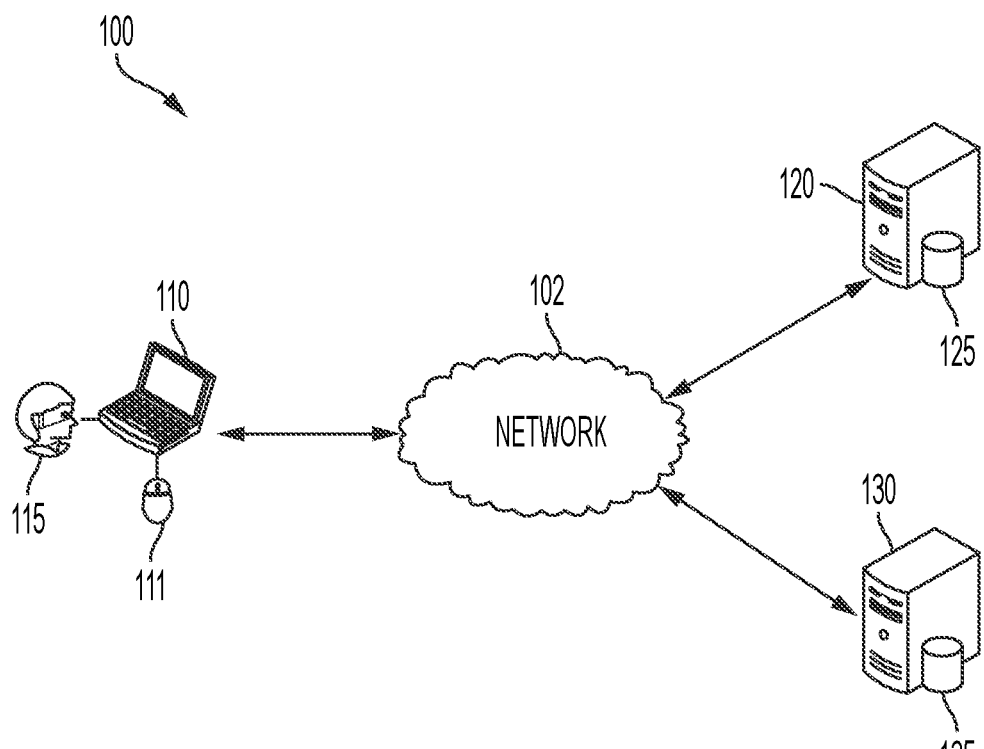
FIG. 1 is a block diagram of a distributed client-server system in accordance with one or more embodiments of the present disclosure.

Embodiments of the present disclosure are directed to bot detection in a front-end application (or "front-end bot detection") based on machine learning and pointer movement data. While the present disclosure is described herein with reference to illustrative embodiments for particular applications, it should be understood that embodiments are not limited thereto. Other embodiments are possible, and modifications can be made to the embodiments within the spirit and scope of the teachings herein and additional fields in which the embodiments would be of significant utility.

Further, when a particular feature, structure, or characteristic is described in connection with one or more embodiments, it is submitted that it is within the knowledge of one skilled in the relevant art to implement such feature, structure, or characteristic in connection with other embodiments whether or not explicitly described. It would also be apparent to one of skill in the relevant art that the embodiments, as described herein, can be implemented in many different embodiments of software, hardware, firmware, and/or the entities illustrated in the drawings. Any actual software code with the specialized control of hardware to implement embodiments is not limiting of the detailed description. Thus, the operational behavior of embodiments will be described with the understanding that modifications and variations of the embodiments are possible, given the level of detail presented herein.

As will be described in further detail below, embodiments of the present disclosure may be used to provide a decoupled or two-sided machine learning framework for bot detection based on pointer movement data. In some embodiments, the pointer movement data may be obtained by tracking the movements of a pointing device via a graphical user interface (GUI) of an application (e.g., a web browser or other client application) executable at a computing device of a user. The pointing device may be, for example, a mouse, stylus, touchpad, touchscreen, or similar type of human interface device that allows the user to interact with the GUI, e.g., for purposes of accessing features of a web service to perform various tasks via a corresponding website hosted at a server over a network. The user interaction may involve the user physically moving the pointing device to change the location of a pointer that echoes the physical movements within the GUI. The pointer may be a visual indicator (e.g., a cursor or other graphical image) displayed on a monitor or other display device that shows the current position for user interaction or receiving input (e.g., from the pointing device) via the GUI. The movement data may include, for example, different sets of coordinates corresponding to different locations of the pointer or pointing device within the GUI between consecutive time intervals. It is assumed for purposes of the examples described herein that the location of the pointer is also the location of the pointing device within the GUI. Thus, the terms "pointer" and "pointing device" may be used interchangeably herein. It should be appreciated, however, that the movement or a change in location of the pointer may be the result of either human interaction with the pointing device or an automated process (i.e., Internet bot or web robot imitating user behavior) without any actual human or user interaction.

In some embodiments, the two-sided machine learning framework for bot detection may include an encoding side that encodes the pointer or pointing device movement data for transmission to a decoding side of the two-sided framework that decodes the encoded data and predicts a likelihood that the tracked movements of the pointing device (or pointer) were produced by human interaction with the pointing device (i.e., by an actual user of the user device). In some implementations, the encoding side may include at least one data encoder associated with a client or "front-end" application at the user device while the decoding side may include at least one data decoder associated with a web service at a "back-end" server. The data encoder(s) in the front-end application may be used to generate, for example, a feature representation of the movement data with encoded features that only the data decoder(s) in the back end can decode. Such a front-end encoder may include a plurality of encoding networks for encoding the coordinates of the different pointer/pointing device locations within the GUI. Each encoding network may be, for example, a separate machine learning model (e.g., neural network) used to encode a sequence of coordinates for a corresponding axis of a multi-dimensional coordinate space representing an interactive content display area of the GUI. Feature building logic in the front-end encoder may then use the encoded data output by each encoding network to generate the feature representation of the movement data with encoded features. As will be described in further detail below, the encoded features may include various pointer movement biometric features and additional task-related features of the pointer movement along different axes of the multi-dimensional coordinate space. The feature representation in this example may include at least one vector representing a sequence of movements for at least one trajectory of the pointing device through one or more functional areas of the GUI and a duration the pointing device stays within each functional area. The feature representation or vector(s) may be transmitted via a network to at least one back-end data decoder that complements the at least one front-end encoder in the two-sided machine learning framework disclosed herein.

Such a back-end decoder may be a trained machine learning model in the form of a decoding classifier implemented at a back-end server communicatively coupled to the user device via the network. A prediction from the back-end decoding classifier may be used in the front-end to determine whether the sequence of movements for the at least one trajectory of the pointing device was produced by an actual user of the user device as opposed to a bot (e.g., an automated process or script executing in the background at the user's device) impersonating the actual user.

In some embodiments, the two-sided machine learning framework, including the decoding classifier at the back-end server, may be associated with one or more web services provided by an online service provider and accessible via a corresponding website loaded within the application (e.g., web browser) executable at the user device. For example, the decoding classifier may be implemented at the back-end server as part of an automated online bot detection service offered by the service provider alongside other web services. In some implementations, the two-sided machine learning framework may be used to offload a substantial portion of the computation from the back-end server to the front-end application (including the front-end encoder) at the user device. This allows the back-end decoder to be implemented as a lightweight decoding classifier and more of the back-end resources to be utilized for tasks related to the service provider's other web services.

The terms "online service," "web service," and "web application" are used interchangeably herein to refer broadly and inclusively to any type of website, application, service, protocol, framework (or relevant portion thereof), e.g., as implemented at a "back-end" server and accessible over a network via a client or "front-end" application executable at a computing device of a user. While various embodiments of the decoupled or two-sided machine learning framework are described in the context of a distributed client-server architecture, e.g., where the encoding and decoding sides of the framework are divided between the front-end client and back-end server, respectively, it should be appreciated that embodiments are not intended to be limited thereto. For example, the encoding and decoding sides of the two-sided machine learning framework disclosed herein may both be implemented at the same device (e.g., using separate applications or services executable at either the user device or the back-end server). Also, while various embodiments will be described below with respect to FIGS. 1-9 in the context of payment processing services provided by an online payment service provider, it should be appreciated that embodiments are not intended to be limited thereto and that the disclosed techniques may be applied to any type of web service or web application provided by a network or online service provider.

FIG. 1 is a block diagram of a distributed client-server system 100 in accordance with an embodiment of the present disclosure. System 100 includes a client device 110 of a user 115, a server 120, and a server 130, all of which are communicatively coupled to one another via a network 102. Client (or user) device 110 may be any type of computing device with at least one processor, local memory, display, and one or more input devices (e.g., a keyboard and a microphone). Examples of such computing devices include, but are not limited to, a mobile phone, a personal digital assistant (PDA), a computer, a cluster of computers, a set-top box, or similar type of device capable of processing instructions.

As shown in FIG. 1, the input devices of client device 110 may also include a pointing device 111 (e.g., a mouse), which allows user 115 to interact with a GUI of an application executable at device 110. While pointing device 111 is shown as a mouse in FIG. 1, it should be appreciated that the disclosed techniques may be applied to any pointing device (e.g., stylus, touchpad, touchscreen, or similar human interface device) that allows a user to input continuous and multi-dimensional spatial data to a computer by moving the pointing device using physical gestures, where such physical movements are echoed by movements of a pointer (e.g., a mouse cursor) displayed on a monitor or other display device of the computer. In some embodiments, user 115 may use pointing device 111 to interact with the GUI of the application at device 110 to access various features of a web service provided by each of servers 120 and 130 via network 102. Each of servers 120 and 130 may be any type of computing device, e.g., a web server or application server, capable of serving and receiving data to and from client device 110 or each other over network 102.

Network 102 may be any network or combination of networks that can carry data communication. Such a network may include, but is not limited to, a wired (e.g., Ethernet) or a wireless (e.g., Wi-Fi and 3G) network. In addition, network 102 may include, but is not limited to, a local area network, a medium area network, and/or a wide area network, such as the Internet. Network 102 may support any of various networking protocols and technologies including, but not limited to, Internet or World Wide Web protocols and services. Intermediate network routers, gateways, or servers may be provided between components of system 100 depending upon a particular application or environment. It should be appreciated that the network connections shown in FIG. 1 are illustrative and any means of establishing a communications link between the computers may be used. The existence of any of various network protocols such as TCP/IP, Ethernet, FTP, HTTP, and the like, and of various wireless communication technologies such as GSM, CDMA, Wi-Fi, and LTE, is presumed, and the various computing devices described herein may be configured to communicate using any of these network protocols or technologies.

In some embodiments, a service provider may use server 120 to provide one or more web services. For example, server 120 may be used to provide a payment processing service of the service provider for processing payments in connection with online transactions between different entities via network 102. Such transactions may include, but are not limited to, payments or money transfers between different users of the service provider. It should be appreciated that the term "users" herein may refer to any individual or other entity (e.g., a merchant or other online service provider) who uses or requests access to use the web service(s) of the service provider. In FIG. 1, for example, user 115 of device 110 may initiate a transaction for the purchase of one or more items sold by a merchant at a physical store or via an online marketplace hosted at server 130 over network 102. The online marketplace in this example may be accessed by user 115 via a web browser or other client application executable at device 110. The online marketplace may provide a checkout option for user 115 to select the payment processing service offered by the service provider at server 120 to complete payment for the purchase. By selecting this option, user 115 may initiate a payment transaction for transferring funds to the merchant from a specified bank account, digital wallet, or other funding source associated with an account of user 115 with the service provider. The payment processing service may assist with resolving electronic transactions through validation, delivery, and settlement of account balances between user 115 and the merchant in this example, where accounts may be directly and/or automatically debited and/or credited using monetary funds in a manner accepted by the banking industry.

It should be appreciated that access to the web service (e.g., payment processing service) may be restricted to only those users who have accounts registered with the service provider. Therefore, user 115 may be required to provide authentication credentials for either logging into an existing account or registering a new account with the service provider, e.g., via an account login page or new account registration page served by server 120 and displayed at device 110. The authentication credentials may be stored along with other relevant account information, e.g., name and other identity attributes, associated with user 115's account, in a database 125 coupled to or otherwise accessible to server 120. In some implementations, a similar account authentication scheme may be employed by the merchant associated with server 130 to authenticate user 115 for transactions involving the purchase of items from the merchant's online marketplace. The authentication credentials and other account information for an account of user 115 with the merchant may be stored in a database 135 coupled to server 130. Each of databases 125 and 135 may be any type of data store or recordable storage medium configured to maintain, store, retrieve, and update information for servers 120 and 130, respectively.

As will be described in further detail below with respect to FIG. 2, the service provider may also use server 120 to implement a bot detection service, e.g., as part of an automated fraud detection and risk management system, to verify that any inputs received via the GUI at device 110 were produced by actual human interaction with pointing device 111 rather than by an automated process or bot imitating user 115 (or input behavior thereof). Such a bot detection service may operate alongside other services (e.g., the payment processing service) offered by the service provider to appropriately assess the risk of granting a user (e.g., user 115) access to requested web services.

Figure 2:
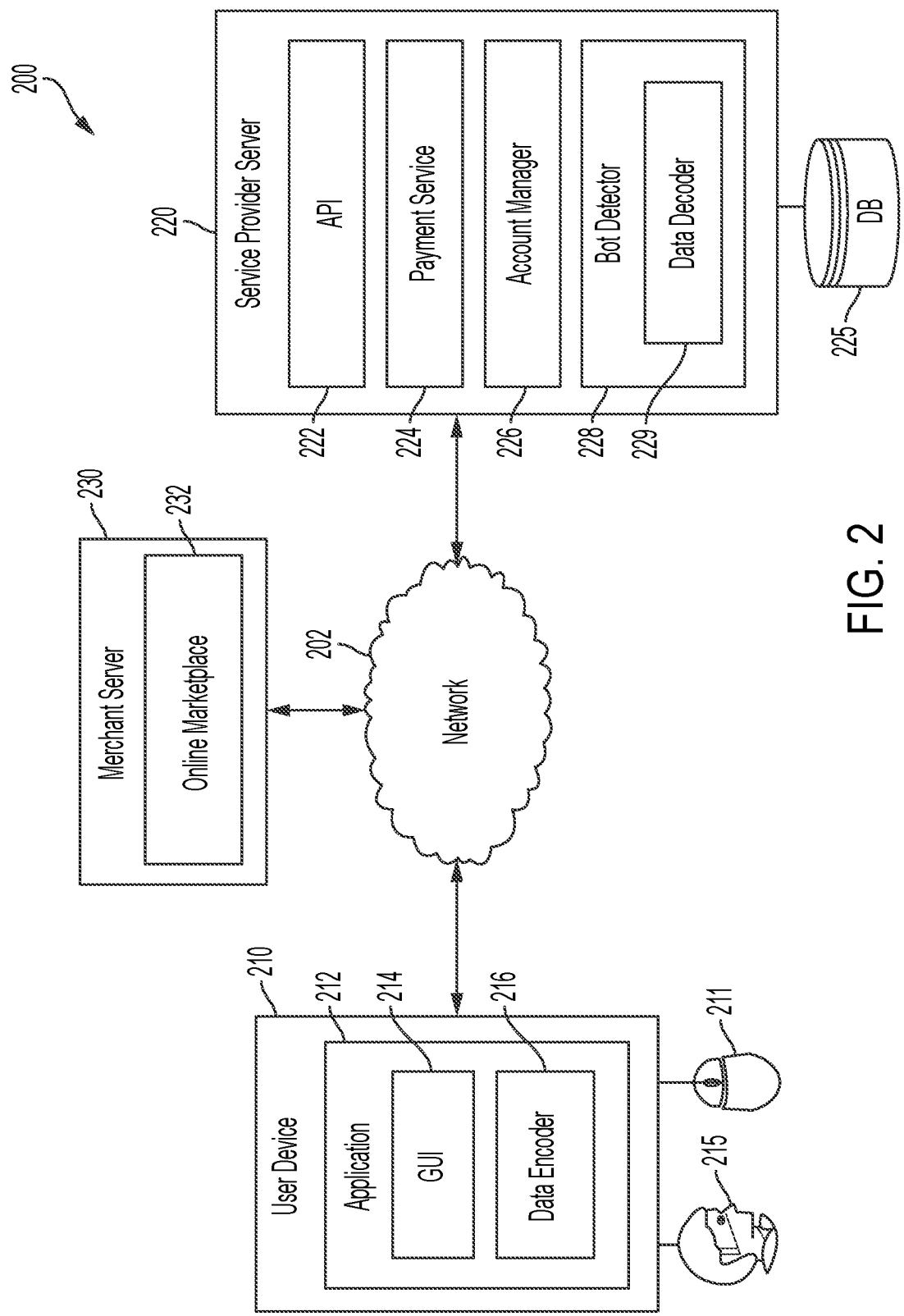
FIG. 2 is a block diagram of a network communication system for a two-sided machine learning framework for bot detection based on pointer movement data, in accordance with one or more embodiments of the present disclosure.

FIG. 2 is a block diagram of a network communication system 200 for a two-sided machine learning framework for bot detection based on pointer movement data, in accordance with one or more embodiments of the present disclosure. For discussion purposes, system 200 will be described using system 100 of FIG. 1, as described above, but system 200 is not intended to be limited thereto. As shown in FIG. 2, system 200 includes a user device 210, a service provider server 220, and a merchant server 230. User device 210 may be implemented using, for example, client device 110 of FIG. 1, as described above. Service provider server 220 and merchant server 230 may be implemented using, for example, servers 120 and 130 of FIG. 1, respectively, as described above. User device 210 along with servers 220 and 230 may be communicatively coupled to one another via a network 202. Each of user device 210, server 220, and server 230 may be implemented using any appropriate combination of hardware and software configured for wired and/or wireless communication over network 202. Network 202 may be implemented using, for example, network 102 of FIG. 1, as described above.

In some embodiments, user device 210 executes an application 212 that a user 215 may use to access the functionality of one or more web services via network 202. Such web services may include, for example, a payment service 224 provided by a service provider using service provider server 220. In some embodiments, the service provider may be an online payment service provider or payment processor, and payment service 224 may include various payment processing services for transactions between different entities. Such transactions may include, for example, transactions between user 215 and a merchant associated with an online marketplace 232 in the form of a web application or service executable at merchant server 230. Examples of payment processing services offered by the service provider as part of payment service 224 include, but are not limited to, payment account establishment and management, fund transfers, digital wallet services, and reimbursement or refund services.

In some embodiments, application 212 may be any of various application programs (e.g., a web browser, a mobile payment application, etc.) executable at user device 210 for accessing the functionality of payment service 224 and online marketplace 232 via corresponding websites hosted at service provider server 220 and merchant server 230, respectively. For example, user 215 may interact with a graphical user interface (GUI) 214 of application 212 using a pointing device 211 (e.g., mouse) coupled to user device 210 to navigate to the corresponding website for each service and perform various tasks. Such tasks may include, for example, initiating one or more transactions with payment service 224 for the purchase and payment of an item sold by the merchant via online marketplace 232. User 215's interactions with GUI 214 for each transaction may produce multiple communications between user device 210 and service provider server 220 and/or merchant server 230 over network 202. Such network communications may include, for example, various types of requests (e.g., payment transaction requests) that require access to features of payment service 224 and/or online marketplace 232, respectively.

In some implementations, application 212 may be a client-side payment service application that interfaces with service provider server 220 over network 202 to facilitate online payment transactions over network 202. Such a client-side service application may also be used to implement security protocols that may be required by payment service 224. Such protocols may include, for example, bot detection protocols that service provider server 220 may use to verify that any request received from user device 210 (e.g., via GUI 214 of application 212) was produced by user 215, as opposed to an automated process (or bot) imitating human interaction with GUI 214, before authorizing access to payment service 224. Such bot detection protocols may be implemented using a bot detection service (or "bot detector") 228 of service provider server 220, as will be described in further detail below.

In some embodiments, service provider server 220 may include an application programming interface (API) 222 for receiving requests from user 215 and other users of payment service 224 over network 202 and serving content (e.g., web content) in response to the received requests. For example, API 222 may be configured to serve web content for display via GUI 214 of application 212 in response to HTTP requests received from user device 210 via network 202. API 222 may also be used to interact with user 215 through GUI 214 of application 212 at user device 210 via one or more protocols (e.g., RESTAPI, SOAP, etc.). The content served by service provider server 220 using API 222 may include, for example, static (pre-generated) or dynamic electronic content related to payment service 224. The type of content that is served may vary according to the type of request and/or account status of the requesting user (e.g., existing users of the service provider with registered accounts vs. new users who do not have registered accounts). For example, a new account registration page (or account login page that includes an option to register a new account) may be served by server 220 in response to any request for access to payment service 224 received from an unrecognized user device or a device of any user who does not have a registered account with the service provider. It should also be appreciated that any of various network or other communication protocols may be used for sending and receiving different types of requests and other communications to and from user devices and applications, as desired for a particular implementation.

Service provider server 220 may be configured to maintain accounts for different entities or users of payment service 224 (e.g., user 215 and the merchant associated with merchant server 230). The account(s) and associated information for each entity/user may be stored in a database (DB) 225 coupled to service provider server 220. In some embodiments, the account information stored in DB 225 may be managed by an account manager 226 of service provider server 220. DB 225 may be any type of data store for storing information accessible to service provider server 220. DB 225 may be implemented using, for example, database 125 of FIG. 1, as described above. In some embodiments, account information for each registered user of the service provider may be stored in DB 225 with a unique identifier and other information relevant to each user account. Such account information may include, for example and without limitation, login credentials (e.g., username and password information), personal contact information (e.g., mailing address and phone numbers), banking information (e.g., bank account numbers and other private financial information related to one or more funding sources, such as digital wallets), and other identity attributes (e.g., Internet Protocol (IP) addresses, device information, etc.).

In some implementations, the identity attributes for each user (and any associated account) may be passed to service provider server 220 as part of a login, search, selection, purchase, payment, or other transaction initiated by the user over network 202. For example, user 215 may use pointing device 211 to interact with GUI 214 of application 212 at user device 210 to access certain features of payment service 224 or information associated with an account of user 215 stored in DB 225. User 215's interactions may generate one or more HTTP requests directed to service provider server 220. Service provider server 220 may use account manager 226 to authenticate or verify the identity of the user based on the information received from user device 210, e.g., as part of a request for access to payment service 224, before authorizing access to information associated with a particular account stored in DB 225 or access to features of payment service 224 in general. Additionally, service provider server 220 may use bot detector 228 to confirm that inputs received via GUI 214 for a request received from user device 210 were produced by user 215, e.g., based on human interaction with pointing device 211 rather than by a bot imitating user behavior.

Bot detector 228 may be, for example, a bot detection service that operates alongside other web services (e.g., payment service 224) at service provider server 220 to appropriately assess the risk of granting a user (e.g., user 215) access to the web services. In some embodiments, bot detector 228 may include a data decoder 229 that works in conjunction with a data encoder 216 at user device 210, e.g., as part of a two-sided machine learning framework for bot detection, as described above and as will be described in further detail below with respect to FIGS. 3-8. In some embodiments, data encoder 216 may be used to encode movement data obtained from tracking the movement of pointing device 211 (or a corresponding pointer displayed) within GUI 214 of application 212 over time. The movement data may be associated with different locations corresponding to at least one trajectory of pointing device 211 within GUI 214 or an interactive content area thereof, as will be described in further detail below.

Figure 3:
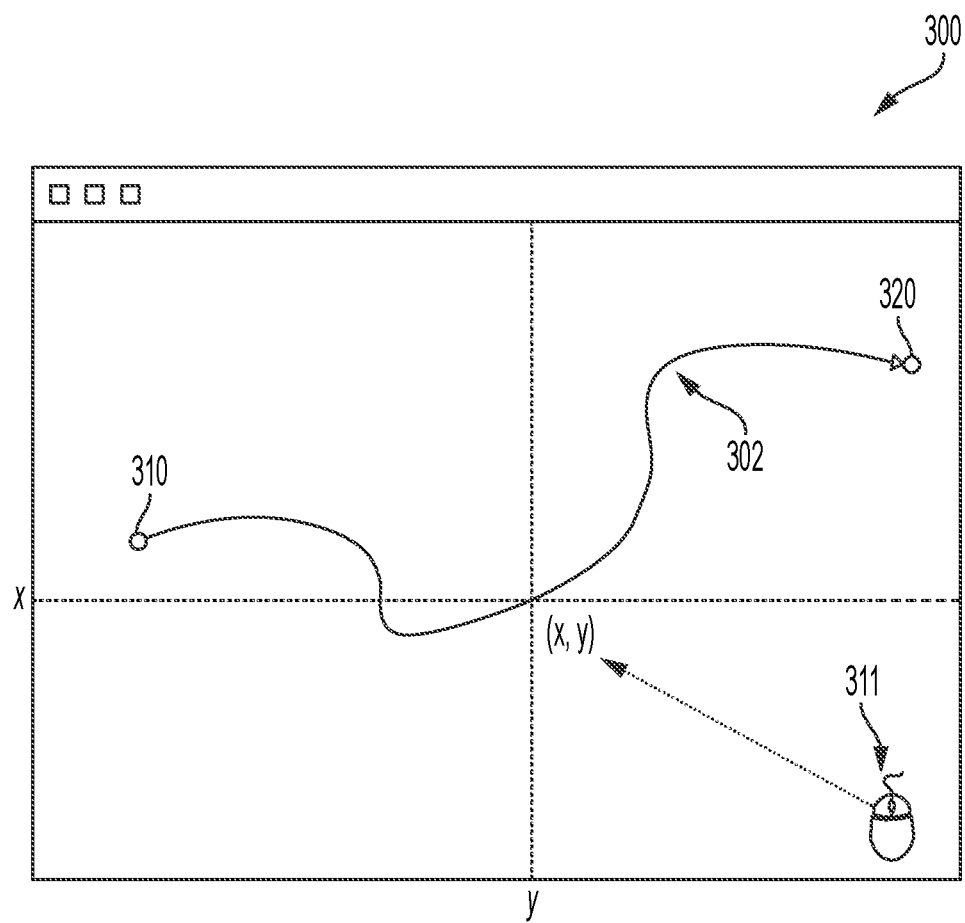
FIG. 3 is an example of a pointer trajectory within a graphical user interface (GUI) of an application executable at a user device, in accordance with one or more embodiments of the present disclosure.

FIG. 3 is an example of a pointer trajectory 302 within a GUI 300 of an application executable at a user device (e.g., user device 210 of FIG. 2, as described above). GUI 300 may be used to implement, for example, GUI 214 of application 212 of FIG. 2, as described above. Pointer trajectory 302 in this example may represent the movement of a pointing device 311 (e.g., a mouse) from a point 310 to a point 320. While pointer trajectory 302 is shown in FIG. 3 as a single line, it should be appreciated that pointer trajectory 302 may represent an overall pointer trajectory based on a sequence of movements of pointing device 311 between different points and locations along the overall trajectory from point 310 to point 320. Each of the different locations of pointing device 311 may be expressed as a set of coordinates that includes a coordinate for each axis in a plurality of coordinate axes of a multi-dimensional coordinate space corresponding to an interactive content display area of GUI 300. The axes may include, for example, an x-axis and a y-axis of a two-dimensional coordinate space, as shown in FIG. 3 for GUI 300. The set of coordinates for each location or point within the coordinate space of GUI 300 may be defined by the ordered pair (x, y), where x is the perpendicular distance from the point to the x-axis, and y is the perpendicular distance from the point to the y-axis. Accordingly, each of the different locations of pointing device 311 within GUI 300 may correspond to either a start point or an end point for each movement of pointing device 311 in the sequence of movements along pointer trajectory 302 over consecutive time intervals. Accordingly, each movement ($M_i$) in a sequence of movements ($M_1$, $M_2$, ..., $M_N$) may be defined by three data fields: $x_i$; $y_i$; and interval$_i$, where "i" is a value between 1 and any integer N that corresponds to the order in which a particular movement of pointing device 311 occurs in the sequence, and interval is the corresponding time interval for the movement between different locations within GUI 300.

In some embodiments, the location of pointing device 311 within the two-dimensional (x, y) coordinate space corresponding to the interactive content display area of GUI 300 may be indicated by a pointer (e.g., a mouse cursor) displayed on the screen of a computer monitor or similar display device, as described above. As will be described in further detail below, the movement data obtained from tracking the movements of pointing device 311, including the coordinates and timestamps for each of the different locations of pointing device 311 within GUI 300 between consecutive time intervals, may be used to determine whether the movements were produced by either human interaction with pointing device 311 or a bot. In some cases, the timestamps for certain locations may be converted or derived from the preceding time intervals associated with preceding movements of pointing device 311 in the sequence of movements along pointer trajectory 302.

In addition to pointer locations and timestamps, the movement data obtained from tracking the movement of pointing device 311 within GUI 300 may include various movement-based biometric features that may also be used for bot detection. Examples of such biometric features include, but are not limited to, an acceleration of the movement, an angle of the movement, a Euclidean norm of the set of coordinates along each axis of the multi-dimensional coordinate space, a curvature of the movement, a movement efficiency, a maximum time interval, and an absolute distance between the different locations of the pointing device. Unlike conventional bot detection techniques that require a sequential or graph-based machine learning model, e.g., a Long Short-Term Memory (LSTM) network, to extract such biometric features from pointer movement data, the disclosed techniques may be used to generate a feature representation of the movement data without using any additional machine learning model. Also, unlike conventional bot detection techniques that require the computing resources of a server to handle the additional computational needs associated with using such a machine learning model to encode biometric features extracted from pointer movement data, the disclosed encoding techniques may be implemented in a client or front-end application executable at the user device.

Further, unlike conventional techniques that rely solely on biometric features in the form of individual float values extracted from pointer movement data, the disclosed techniques may be used to derive additional features that effectively capture task related information from the movement data obtained by tracking the movements of pointing device 311 via GUI 300 of the application at the user device. Such additional features may be used, for example, to identify a particular task associated with the user's interactions with GUI 300. By contrast, biometric features alone are insufficient to identify the task that the user is performing in the application based on the movements of pointing device 311 within GUI 300.

Returning to system 200 of FIG. 2, data encoder 216 of application 212 at user device 210 may be used to extract the additional task-related features along with the biometric features described above from the movement data obtained by tracking the movement of pointing device 211 via GUI 214. In some implementations, the task-related features may be combined with the biometric features for purposes of bot detection. In some embodiments, data encoder 216 may derive the additional task-related features by mapping the movement data to functional areas corresponding to a range of the different locations of pointing device 211 within GUI 214. As described above, the movement data may include a set of coordinates and a timestamp for each of these different pointer locations.

In some embodiments, the movement data (including the coordinates and timestamps) may be mapped by data encoder 216 to functional areas corresponding to a range of the different locations of pointing device 211 within GUI 214 (or interactive content display area thereof) over consecutive time intervals. The interactive content display area of GUI 214 may be defined by a two-dimensional (x, y) coordinate space, as described above. For example, all movements of pointing device 211 may correspond to locations that fall within a range of coordinates from 0 to 100 along each axis of the two-dimensional coordinate space, i.e., from {x: 0, y: 0} to {x: 100, y: 100}. The functional areas may correspond to equally-sized sections of the two-dimensional space in this example. Each functional area may be, for example, a 10-by-10 square section of the 100-by-100 two-dimensional coordinate space, where the dimensions of each section range from 0 to 10 coordinates along each of the x and y axes. Accordingly, there may be a total of 100 functional areas (e.g., from $FA_1$ to $FA_{100}$) within the two-dimensional coordinate space, where $FA_1$: {x: 0-10, y: 0-10}, $FA_2$: {x: 10-20, y: 0-10}, ..., $FA_{100}$: {x: 90-100, y: 90-100}. It should be appreciated that embodiments of the present disclosure are not limited to the size and dimensions of the coordinate space and functional areas described in this example and that any multi-dimensional coordinate space with functional areas of any size and dimension may be used as desired for a particular implementation. Accordingly, the number of functional areas may vary according to the size and dimensions of each area and coordinate space defined for a particular implementation.

The mapping of the movement data, including all location coordinates, to functional areas may reveal at least one trajectory of pointing device 211 through the interactive content display area of GUI 214, e.g., as defined by the two-dimensional coordinate space, as described above. In some embodiments, the mapped movement data may be used to generate at least one vector representing a sequence of movements for the at least one trajectory of pointing device 211 through one or more of the functional areas and a duration that pointing device 211 stays within each functional area. In some implementations, a vector of length n (where n equals the number of functional areas defined) may be generated for each time interval in which the movement of pointing device 211 is tracked within GUI 214. For each functional area in which pointing device 211 stays for at least a minimum duration, a corresponding field (k) of the vector may be updated with a time value representing the duration. The minimum duration may be, for example, a predetermined noise threshold for tracking pointer movement, where any duration or time value below the threshold may be disregarded as noise. The minimum duration or threshold may vary depending on the type of pointing device used for a particular implementation and may be derived from empirical testing of pointer movement data for the particular implementation.

In some embodiments, an element-wise aggregation of vector time values may then be performed to produce an output vector that includes the duration in which pointing device 211 stays within each functional area. When functional areas are close to each other, the corresponding time values may be correlated, and a convolution operation may be performed to propagate the movement data across different functional areas to reduce sparsity. In some implementations, a convolution process may be used to generate the output vector, e.g., according to a functional area (FA) convolution algorithm, as shown in FIG. 4.

FIG. 4 is an algorithm 400 for a FA convolution process to generate at least one vector representing a sequence of movements for at least one trajectory of a pointing device through one or more functional areas of a GUI. The trajectory of the pointing device through the functional areas may vary based on the functional area parameters defined for a particular implementation. Such parameters may include, for example, the total number of functional areas (n) and the dimensions (e.g., width and length) of each functional area relative to the coordinate axes (e.g., x and y axes) of the coordinate space corresponding to the interactive content display area of the GUI, as described above. As shown in FIG. 4, other parameters that may be relevant to the convolution process of algorithm 400 include the width of each functional area ($w_x$) and the largest or maximum coordinates along the x and y axes ($m_x$ and $m_y$, respectively). As each field (k) of the FA_Conv vector (v) generated by this process retains the coordinates and timestamp information for different locations of the pointing device along its trajectory through the functional areas, it may be used to infer the task that a user (e.g., user 215 of FIG. 2) is performing via the GUI of the application at the user device. The average duration the pointing device stays within the functional areas or average stay time (FA_Stay) of the pointing device may be computed by dividing the sum of all time values in the generated FA_Conv vector by the number of non-zero values in the FA_Conv vector.

In some implementations, FA_Conv and FA_Stay may represent additional task-related features of the pointer movement data, which may be combined with biometric features (e.g., acceleration, angle of movement, average and Euclidean norm of coordinates along each axis, curvature, efficiency, maximum time interval, and absolute distance) for purposes of bot detection, as described above. Also, as described above, such features of the pointer movement data may be encoded and combined into a feature representation generated by a data encoder (e.g., data encoder 216 of FIG. 2) in a client or front-end application executable at the user device. In some embodiments, such a front-end data encoder may be part of a two-sided machine learning (ML) framework, which includes a data decoder (e.g., data decoder 229) implemented at a back-end server (e.g., service provider server 220 of FIG. 2, as described above).

By encoding pointer movement data in the front-end, the disclosed two-sided ML framework provides several advantages over conventional ML frameworks, in which the majority of the feature encoding and processing is performed by a server in the back-end (e.g., at service provider server 220 of FIG. 2, as described above). For example, using a front-end encoder for bot detection allows much of the computational burden to be offloaded from the back-end server and allows the computing resources of the back-end server to be utilized for other tasks related to the web service. This enables the service provider to improve the response time and user experience of the web service while providing bot detection for risk management at the application layer. There are, however, two major challenges that need to be addressed before deploying a neural network or ML model in the front-end: (1) model stealing; and (2) adversarial attacks, which are discussed in turn below.

When an ML model is hosted on a cloud server as in conventional ML frameworks, the model is essentially a black box to end users. This prevents a potential adversary from accessing the internal parameters of the model, and any malicious behavior can be easily restricted. By contrast, when a model is deployed on a user's device, the user is likely to have full control of the model and its parameters. A knowledgeable adversary may be able to use this information to quickly find a pattern or behavior that can bypass bot detection.

An adversarial attack may involve modifying the input for a trained ML model with a very small (and often imperceptible) change that causes the model to produce an incorrect classification or prediction as a result. Such adversarial attacks may be directly applied to a bot detection model to evade detection, especially when the model is implemented at a user's device and freely accessible to the user.

As will be described in further detail below with respect to FIGS. 5-7, the disclosed two-sided ML framework addresses the aforementioned challenges associated with a front-end encoding model by: (1) preventing attackers from generating fake traffic to bypass the model; (2) hiding computation details from the user; and (3) securing the ML models from being tested for patterns that can be used to bypass detection.

Figure 5:
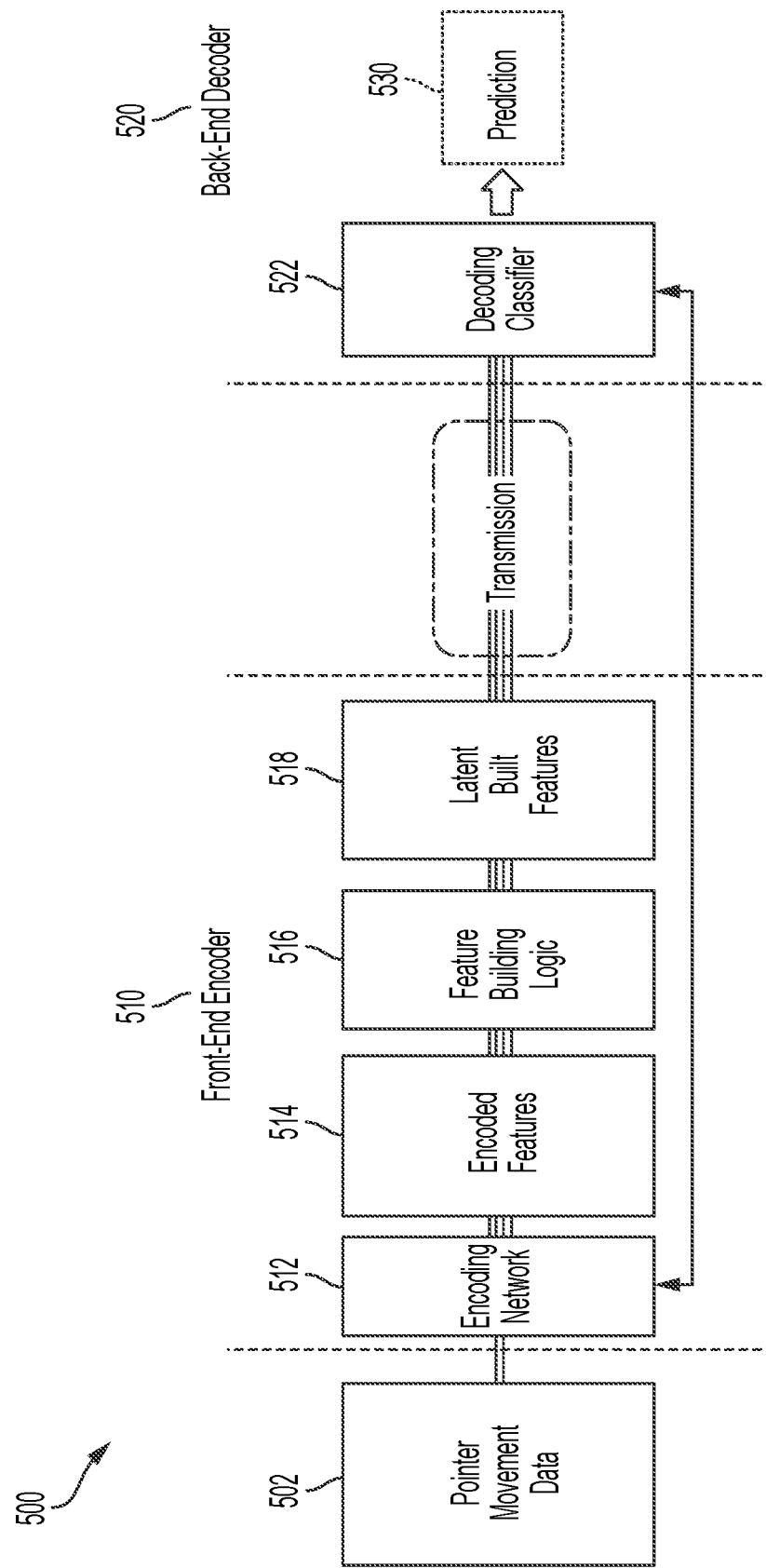
FIG. 5 is a block diagram of an illustrative two-sided machine learning framework for bot detection based on pointer movement data, in accordance with one or more embodiments of the present disclosure.

FIG. 5 is a block diagram of an illustrative two-sided machine learning (ML) framework 500 for bot detection based on pointer movement data, in accordance with one or more embodiments of the present disclosure. As shown in FIG. 5, ML framework 500 includes a front-end encoder 510 and a back-end decoder 520. Front-end encoder 510 may be implemented at a client or front-end application at a user device (application 212 at user device 210 of FIG. 2, as described above). Back-end decoder 520 may be implemented at a server (e.g., service provider server 220 of FIG. 2, as described above), which is communicatively coupled to the user device via a network (e.g., network 202 of FIG. 2, as described above). The aim of front-end encoder 510 may be to encode pointer movement data while hiding computation logic. The output of front-end encoder 510 may be a latent feature representation 518 of the movement data with encoded features that can only be decoded by decoding classifier 522, as will be described in further detail below. This design secures the front-end encoding process while also preventing attackers from circumventing the process to evade bot detection.

In some embodiments, front-end encoder 510 may include at least one encoding network 512 to encode pointer movement data 502 for transmission to a decoding classifier 522 of back-end decoder 520. Pointer movement data 502 may include, for example, different sets of coordinates and timestamps for different locations of a pointing device (e.g., pointing device 211 of FIG. 2, as described above) within a GUI of a (front-end) application executable at a user device (e.g., user device 210 of FIG. 2, as described above) between consecutive time intervals. The different locations may correspond to a sequence of movements for one or more trajectories of the pointing device through different functional areas of the GUI, as described above. Encoding network 512 may encode the data collected for such pointer movement trajectories into a set of encoded features 514. Encoded features 514 may include, for example, various pointer movement biometric features and additional task-related features (e.g., FA_Conv and FA_Stay) of the pointer movement along different axes of a multi-dimensional coordinate space corresponding to an interactive content display area of the GUI, as described above. Feature building logic 516 of front-end encoder 510 may then be used to generate latent feature representation 518 (e.g., in the form of one or more latent vectors), including the encoded biometric and task-related (FA) features, of the sequence of movements for the at least one trajectory of the pointing device. As described above, latent feature representation (or latent vector) 518 may be encoded in a format that can only be decoded by decoding classifier 522.

Decoding classifier 522 may be a trained ML classifier of back-end decoder 520 that generates a prediction 530 based on the latent feature vector(s) received from front-end encoder 510. Decoding classifier 522 may decode the encoded feature data and use the decoded features to predict a likelihood that the sequence of movements for the at least one trajectory of the pointing device was produced by an actual user of the user device, i.e., based on human interaction with the pointing device as opposed to a bot without any user involvement. As the majority of the encoding and processing of features is performed in the front-end portion of ML framework 500, decoding classifier 522 in the back-end may be implemented as a light classifier designed only to decode and recognize the encoded features for bot detection.

In some embodiments, encoding network 512 may include, for example, a plurality of encoding networks for encoding the coordinates for different locations of a pointing device within a GUI (e.g., pointing device 211 within GUI 214 of FIG. 2, as described above) of a (front-end) application executable at a user device (e.g., user device 210 of FIG. 2, as described above). Each encoding network may be, for example, a separate ML model (e.g., neural network) used to encode a sequence of coordinates for a corresponding axis of a multi-dimensional coordinate space representing an interactive content display area of the GUI. In some implementations, decoding classifier 522 may include a plurality of decoding classifiers, where each decoding classifier is a trained ML model for decoding the encoded data produced by a corresponding ML model of encoding network 512. In some embodiments, the respective ML models of encoding network 512 and decoding classifier 522 may be trained as a training pair using a decoupled training process, e.g., as shown in FIG. 6.

Figure 6:
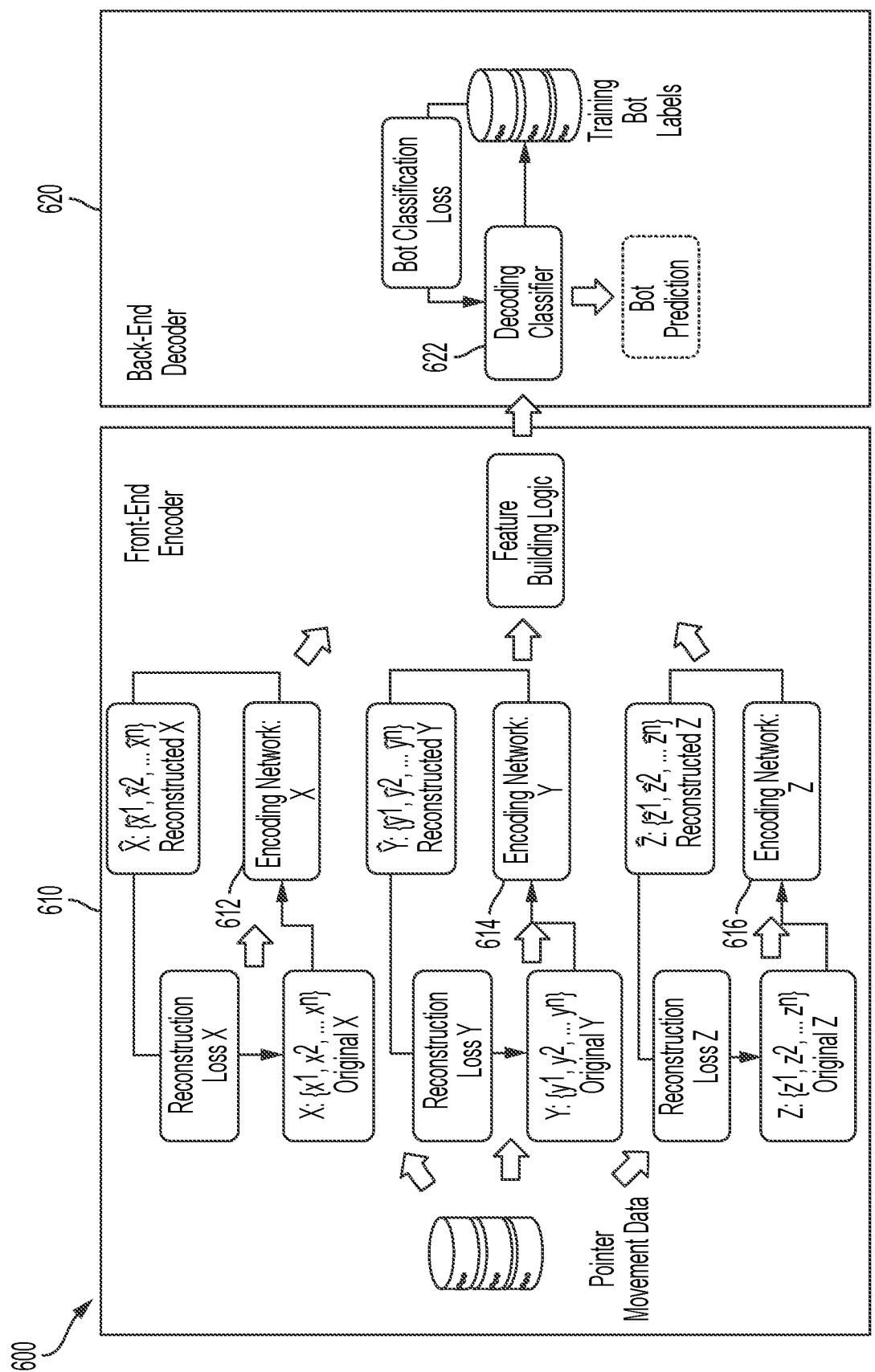
FIG. 6 is a flow diagram of a decoupled training process for a two-sided machine learning framework for bot detection based on pointer movement data, in accordance with one or more embodiments of the present disclosure.

FIG. 6 is a flow diagram of a decoupled training process 600 for a two-sided machine learning framework (e.g., ML framework 500 of FIG. 5, as described above) for bot detection based on pointer movement data, in accordance with one or more embodiments of the present disclosure. The training data may include, for example, movement data (e.g., pointer movement data 502 of FIG. 5) obtained by tracking the movement of a pointing device via a GUI of an application over time. The movement data in this example may be associated with different locations of the pointing device within the GUI between consecutive time intervals. As described above, the movement data may include a set of coordinates (e.g., x and y coordinates) and a timestamp (z) for each of the different locations of the pointing device between the consecutive time intervals. As shown in FIG. 6, the movement data may be encoded into a latent feature representation by a front-end encoder 610 of the ML framework at a user device for transmission to a back-end decoder 620 (or decoding classifier 622 thereof) capable of decoding the encoded data at a server. In some implementations, the movement data used for training the front-end and back-end ML models may be refreshed for each communication session between the user device and the server, as will be described in further detail below. It should be appreciated that the encoding and decoding processes along with the corresponding ML models may be implemented using different programming languages that are appropriate for the respective software and hardware of the front-end and back-end devices. For example, all processes and models in the front-end may be written using JavaScript for running in a web browser or other client application at the user device while the decoding classifier at the back-end server may be written using Python for supporting a greater variety of ML or deep learning models.

In some embodiments, a separate encoding network of front-end encoder 610 may be used to encode a sequence of coordinates for each axis of a two-dimensional (x, y) coordinate space corresponding to the interactive content display area of the GUI in this example. For example, an encoding network 612 may be used to encode a sequence of coordinates corresponding to the x-axis of the coordinate space while an encoding network 614 may be used to encode a sequence of coordinates corresponding to the y-axis. An additional encoding network 616 may be used to encode the timestamps (z) corresponding to different sets of coordinates for the different locations of the pointing device within the GUI.

Figure 7:
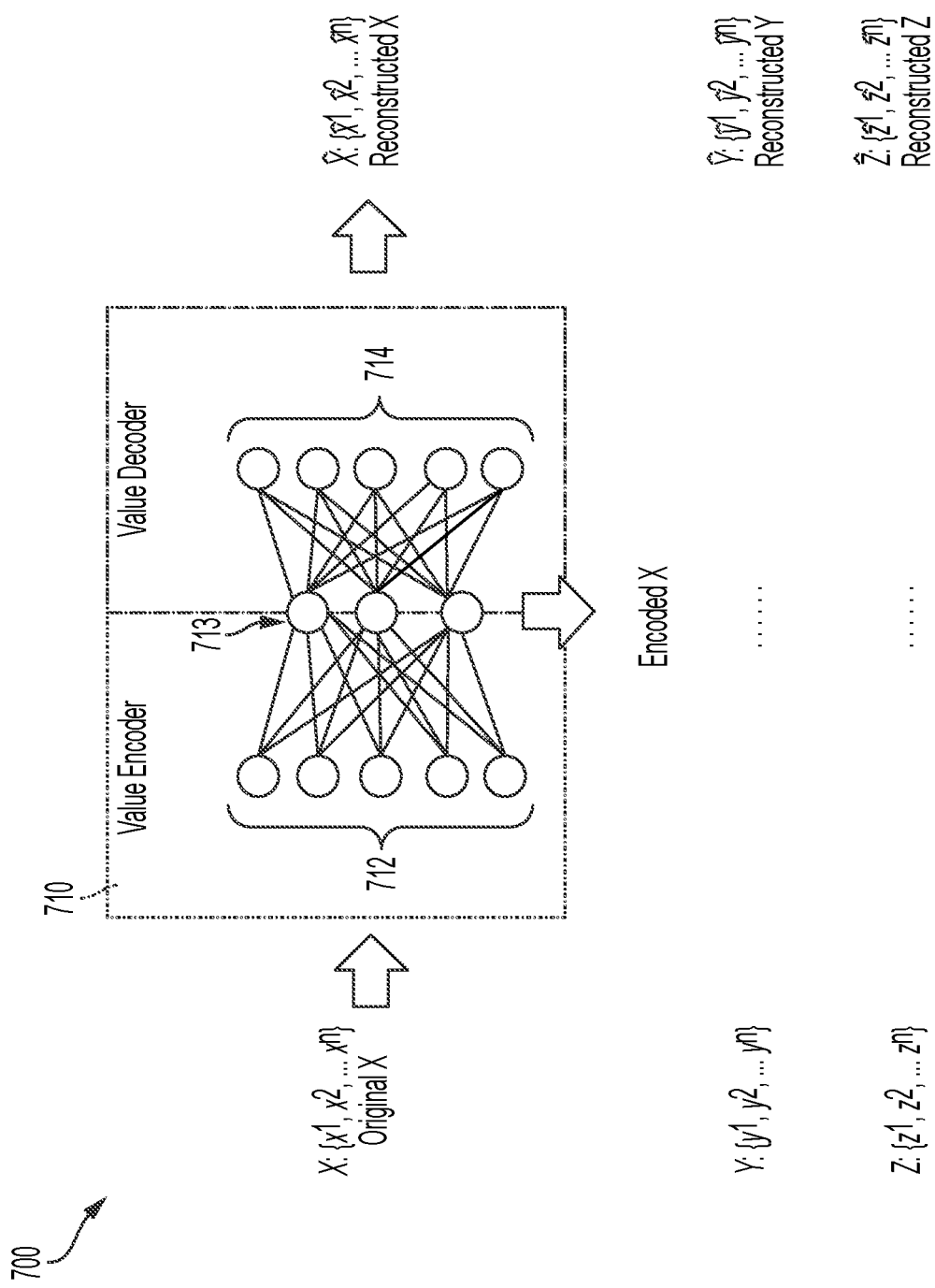
FIG. 7 illustrates an example of an encoding network architecture for encoding pointer movement data for bot detection, in accordance with one or more embodiments of the present disclosure.

In some implementations, each encoding network may be designed using an encoder-decoder architecture as shown in FIG. 7. In FIG. 7, an encoding network architecture 700 may be used to design each of encoding networks 612, 614, and 616 of FIG. 6 for encoding the movement data, i.e., x, y, and z values, respectively, for different pointer locations within the coordinate space of the GUI, as described above. While the network architecture for encoding only values of x is shown in FIG. 7, it should be appreciated that a similar network architecture may be used for encoding each of the y and z values in this example.

As shown in FIG. 7, an encoding network 710 for encoding a sequence of x-axis coordinates includes a plurality of input nodes 712. Input nodes 712 may represent the points within encoding network 710 to which input data (e.g., a vector X including the sequence of x-axis coordinates) is applied. Encoding network 710 also includes a plurality of output nodes 714, where each output node may represent a predicted or reconstructed value of x based on the input data at input nodes 712. Between input nodes 712 and output nodes 714 are one or more layers of hidden nodes 713. Hidden nodes 713 connect one or more of input nodes 712 to one or more output nodes 714. Each of hidden nodes 713 may perform an encoding function that is determined or learned during a training phase of encoding network 710. While encoding network 710 as shown in FIG. 7 includes five input nodes 712, three hidden nodes 713, and five output nodes 714, it should be appreciated that any number of input nodes and output nodes may be used as desired for a particular implementation of each encoding network. Likewise, any number of hidden nodes, which may be spread across any number of hidden layers, may be used as desired for a particular implementation.

Also, as shown in FIG. 7, input nodes 712 may correspond to an encoder portion of architecture 700 for encoding the movement data (e.g., x-axis values) into latent values. Output nodes 714 may correspond to a decoder portion of architecture 700 for decoding the latent values. The purpose of the decoder portion of architecture 700 may be to ensure that the original input data can be reconstructed from the encoded information while the encoding network is trained. Thus, any reconstruction loss (e.g., according to a predetermined loss function) may be used during training to ensure the encoded features retain the original data. After the encoding network is trained, only the encoder portion of architecture 700 needs to be used for front-end encoding operations, e.g., as performed during a communication session between a front-end application (e.g., application 212 at user device 210 of FIG. 2) and a back-end server (e.g., service provider server 220 of FIG. 2), as described above.

Returning to training process 600 of FIG. 6, the outputs of encoding networks 612, 614, and 616 may be provided as inputs to feature building logic (e.g., as implemented using feature building logic 516 of front-end encoder 510 in FIG. 5, as described above). The output of the feature building logic may be a latent feature representation of the movement data (e.g., in the form of one or more latent vectors), which can only be decoded and used by decoding classifier 622 of back-end decoder 620 for bot prediction. The latent feature representation may include, for example, the encoded biometric and task-related (FA) features associated with the sequence of movements for at least one trajectory of the pointing device, as described above.

In some embodiments, decoding classifier 622 of back-end decoder 620 may include a plurality of decoding classifiers corresponding to the plurality of encoding networks of front-end encoder 610. Each decoding classifier may be a trained ML model for decoding the encoded data produced by a corresponding encoding network of front-end encoder 610. In some embodiments, the encoding networks of front-end encoder 610 and decoding classifier 622 of back-end decoder 620 may be trained as a training pair using decoupled training process 600. The objective of the encoding networks is to encode the original movement data obtained by tracking the movement of the pointing device via the GUI, as described above. Thus, reconstruction loss may be used during training to ensure the encoded features retain the original data information. In some implementations, the encoding networks may be trained using unsupervised learning. Decoding classifier(s) 622 may be trained using the encoded features built with the feature building logic of front-end encoder 610. The encoded features may be mapped with bot labels that refer to the original data. The encoded features and bot labels may then be used to train decoding classifier(s) 622. In this way, each decoding classifier 622 can recognize the features encoded by a corresponding encoding network and use those features to generate an appropriate bot prediction. The above-described training strategy decouples the training process for front-end and back-end models. This in turn allows each set of models to be written in a programming language that is most suited to the runtime environment in which the models are implemented (e.g., JavaScript for encoding network models implemented in a front-end application at a user device versus Python for decoding classifiers implemented at a back-end server).

In some implementations, the models may be refreshed and retrained for each communication session between the front-end application (e.g., web browser) at the user device and the back-end server to mitigate the risk of fraud due to model stealing and/or adversarial attacks, as described above. Model refreshing may involve, for example, rotating the front-end and back-end models such that a different set or combination of front-end and back-end models is used for each communication (or browser) session. If there are m possible front-end encoding networks and n possible back-end classifiers, for example, there may be a total of m×n possible combinations of encoders and decoders that may be available for use. Such a decoupled training strategy significantly reduces the chances of a potential adversary from discovering which pair of encoder and decoder models are used for a particular communication session and manipulating model parameters to circumvent bot detection. Even if an adversary learns which model combination is used to bypass bot detection, e.g., during a browser session, the adversary still would not be able to replicate the attack and continue bypassing bot detection for a subsequent session, e.g., once the browser page is refreshed.

Figure 8:
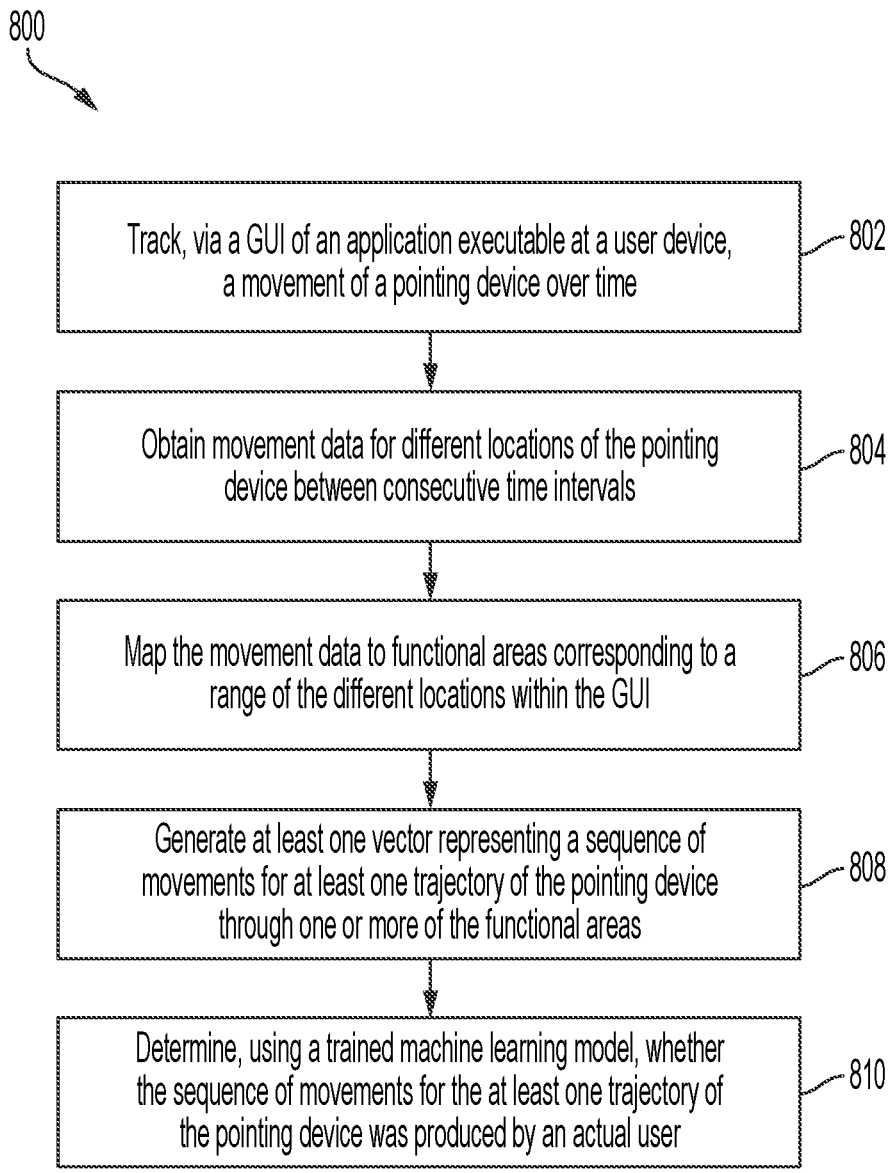
FIG. 8 is a flow diagram of a process for bot detection based on machine learning and pointer movement data, in accordance with one or more embodiments of the present disclosure.

FIG. 8 is a flow diagram of a process 800 for bot detection based on machine learning and pointer movement data, in accordance with one or more embodiments of the present disclosure. For discussion purposes, process 800 will be described using system 200 of FIG. 2 and ML framework 500 of FIG. 5, as described above, but process 800 is not intended to be limited thereto. Process 800 may be performed by, for example, data encoder 216 of FIG. 2, e.g., as implemented using front-end encoder 510 of FIG. 5, as described above.

As shown in FIG. 8, process 800 begins in block 802, which includes tracking, via a graphical user interface (GUI) of an application (e.g., GUI 214 of application 212 of FIG. 2, as described above) executable at a user device (e.g., user device 210 of FIG. 2, as described above), a movement of a pointing device (e.g., pointing device 211 of FIG. 2) over time.

In block 804, movement data may be obtained for the pointing device based on the tracking in block 802. The movement data may be associated with different locations of the pointing device within the GUI between consecutive time intervals. The movement data may include, for example, a set of coordinates and a timestamp for each of the different locations of the pointing device between the consecutive time intervals. The set of coordinates for each of the different locations of the pointing device may include a coordinate for each axis in a plurality of coordinate axes of a multi-dimensional coordinate space corresponding to an interactive content display area of the GUI. In some embodiments, a plurality of biometric features may be derived from the movement data or tracked movement of the pointing device within the interactive content display area of the GUI over the consecutive time intervals. Such biometric features may include, for example and without limitation, an acceleration of the pointing device, an angle of the movement, a Euclidean norm of the set of coordinates along each axis of the multi-dimensional coordinate space, a curvature of the movement, a movement efficiency, a maximum time interval, and an absolute distance between the different locations of the pointing device.

Process 800 may then proceed to block 806, which includes mapping the movement data to functional areas corresponding to a range of the different locations of the pointing device within the GUI over the consecutive time intervals. In block 808, the mapped movement data may be used to generate at least one vector representing a sequence of movements for at least one trajectory of the pointing device through one or more of the functional areas and a duration the pointing device stays within each functional area.

Process 800 may then proceed to block 810, which includes determining, using at least one trained machine learning model and based on the at least one vector, whether the sequence of movements for the at least one trajectory of the pointing device was produced by an actual user of the user device, i.e., through human interaction with the pointing device as opposed to a bot. In some embodiments, the at least one trained machine learning model may include at least one data encoder and at least one data decoder. The at least one data encoder may be used to generate a feature representation of the at least one vector with encoded features to be decoded and used by the at least one data decoder for predicting a likelihood that the sequence of movements for the at least one trajectory of the pointing device was produced by the actual user of the user device. In some embodiments, the at least one data encoder may include a plurality of encoding networks for encoding the at least one vector generated in block 808, where each encoding network may be used to encode a sequence of coordinates for a corresponding axis in the plurality of coordinate axes of the multi-dimensional coordinate space.

In some embodiments, the at least one data encoder may be a front-end encoder (e.g., front-end encoder 510 of two-sided ML framework 500 of FIG. 5, as described above) implemented in the application executable at the user device while the at least one data decoder may be a back-end decoding classifier (e.g., decoding classifier 522 of data decoder 520 of FIG. 5, as described above) implemented at a server communicatively coupled to the user device over a network. The application executable at the user device may be, for example, a web browser including the front-end encoder, and the back-end decoding classifier at the server may be associated with a web service accessible via a corresponding website loaded within the web browser. In some implementations, the front-end encoder may be loaded from the back-end server and installed at the user device (e.g., as part of a browser plugin or extension) when the user navigates to the corresponding website. The feature representation (e.g., latent feature representation 518 of FIG. 5, as described above) may be transmitted from the front-end encoder to the back-end decoding classifier via the network. In some embodiments, the back-end decoding classifier may be trained using training data mapped to labeled features of the latent feature representation generated by the front-end encoder. The determination in block 810 of whether the sequence of movements for the at least one trajectory of the pointing device was produced by the actual user of the user device may be based on a prediction received from the back-end decoding classifier via the network in response to the transmitted feature representation.

Figure 9:
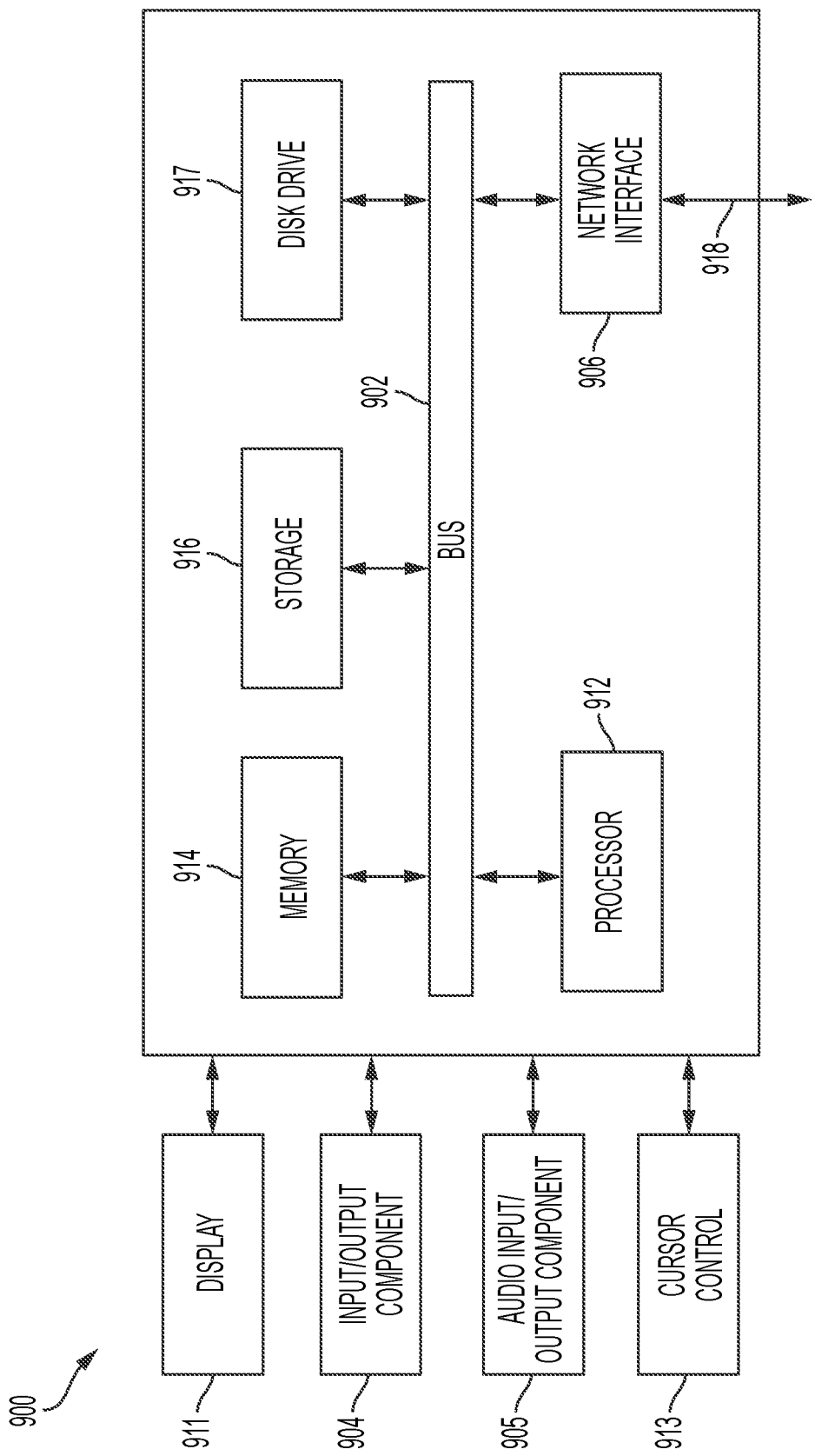
FIG. 9 is a block diagram of a computer system in which embodiments of the present disclosure may be implemented.

FIG. 9 is a block diagram of a computer system 900 in which embodiments of the present disclosure may be implemented. Computer system 900 may be suitable for implementing, for example, one or more components of the devices and servers in systems 100 and 200 of FIGS. 1 and 2, respectively, according to various implementations of the present disclosure. Computer system 900 may also be suitable for implementing workflows 300 and 400 of FIGS. 3 and 4, respectively, and process 600 of FIG. 6, as described above. In various implementations, a client or user device may comprise a personal computing device e.g., smart phone, a computing tablet, a personal computer, laptop, a wearable computing device such as glasses or a watch, Bluetooth device, key FOB, badge, etc.) capable of communicating with a service provider over a network, e.g., network 102 or 202 of system 100 or 200, respectively. The service provider may utilize a network computing device (e.g., a network server) capable of communicating with the network. It should be appreciated that each of the devices utilized by users and service providers may be implemented as computer system 900 in a manner as follows.

Computer system 900 includes a bus 902 or other communication mechanism for communicating information data, signals, and information between various components of computer system 900. Components include an input/output (I/O) component 904 that processes a user action, such as selecting keys from a keypad/keyboard, selecting one or more buttons, image, or links, and/or moving one or more images, etc., and sends a corresponding signal to bus 902. I/O component 904 may also include an output component, such as a display 911 and a cursor control 913 (such as a keyboard, keypad, mouse, etc.). An optional audio input/output component 905 may also be included to allow a user to use voice for inputting information by converting audio signals. Audio I/O component 905 may allow the user to hear audio. A transceiver or network interface 906 transmits and receives signals between computer system 900 and other devices, such as another communication device, service device, or a server (e.g., service provider server 220 of FIG. 2, as described above) via a network (e.g., network 202 of FIG. 2, as described above). In some implementations, the signal transmission may be wireless, although other transmission mediums and methods may also be suitable. One or more processors 912, which can be a micro-controller, digital signal processor (DSP), or other processing component, processes these various signals, such as for display on computer system 900 or transmission to other devices via a communication link 918. Processor(s) 912 may also control transmission of information, such as cookies or IP addresses, to other devices.

Components of computer system 900 also include a system memory component 914 (e.g., RAM), a static storage component 916 (e.g., ROM), and/or a disk drive 917. Computer system 900 performs specific operations by processor(s) 912 and other components by executing one or more sequences of instructions contained in system memory component 914. Logic may be encoded in a computer readable medium, which may refer to any medium that participates in providing instructions to processor(s) 912 for execution. Such a medium may take many forms, including but not limited to, non-volatile media, volatile media, and transmission media. In various implementations, non-volatile media includes optical or magnetic disks, volatile media includes dynamic memory, such as system memory component 914, and transmission media includes coaxial cables, copper wire, and fiber optics, including wires that comprise bus 902. In one implementation, the logic is encoded in non-transitory computer readable medium. In one example, transmission media may take the form of acoustic or light waves, such as those generated during radio wave, optical, and infrared data communications.

Some common forms of computer readable media includes, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various implementations of the present disclosure, execution of instruction sequences to practice the present disclosure may be performed by computer system 900. In various other implementations of the present disclosure, a plurality of computer systems 900 coupled by communication link 918 to the network (e.g., such as a LAN, WLAN, PTSN, and/or various other wired or wireless networks, including telecommunications, mobile, and cellular phone networks) may perform instruction sequences to practice the present disclosure in coordination with one another.

Although the various components of computer system 900 are described separately, it should be appreciated that the functionality of the various components may be combined and/or performed by a single component and/or multiple computing devices in communication with one another, as desired for a particular implementation.

Where applicable, various implementations provided by the present disclosure may be implemented using hardware, software, or combinations of hardware and software. Also, where applicable, the various hardware components and/or software components set forth herein may be combined into composite components that include software, hardware, and/or both without departing from the spirit of the present disclosure. Where applicable, the various hardware components and/or software components set forth herein may be separated into sub-components that include software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The various features and steps described herein may be implemented as systems that include one or more memories storing various information described herein and one or more processors coupled to the one or more memories and a network, wherein the one or more processors are operable to perform steps as described herein, as non-transitory machine-readable medium that includes a plurality of machine-readable instructions which, when executed by one or more processors, are adapted to cause the one or more processors to perform a method that includes steps described herein, and methods performed by one or more devices, such as a hardware processor, user device, server, and other devices described herein.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A system comprising:
one or more hardware processors; and
a non-transitory memory having stored therein instructions that are executable by the one or more hardware processors to cause the system to perform operations comprising:
tracking, via a graphical user interface (GUI) of an application executable at a user device, a movement of a pointing device over time;
obtaining, based on the tracking, movement data associated with different locations of the pointing device within the GUI between consecutive time intervals, the movement data including a set of coordinates and a timestamp for each of the different locations of the pointing device between the consecutive time intervals;
mapping the movement data to functional areas corresponding to a range of the different locations of the pointing device within the GUI over the consecutive time intervals;
generating, based on the mapped movement data, at least one vector representing a sequence of movements for at least one trajectory of the pointing device through one or more of the functional areas and a duration the pointing device stays within each functional area; and
determining, using at least one trained machine learning model and based on the at least one vector, whether the sequence of movements for the at least one trajectory of the pointing device was produced through human interaction with the pointing device by an actual user of the user device.

2. The system of claim 1, wherein the at least one trained machine learning model includes at least one data encoder and at least one data decoder, and wherein the operations further comprise:
generating, using the at least one data encoder, a feature representation of the at least one vector with encoded features to be decoded and used by the at least one data decoder for predicting a likelihood that the sequence of movements for the at least one trajectory of the pointing device was produced by the actual user of the user device.

3. The system of claim 2,
wherein the set of coordinates for each of the different locations of the pointing device includes a coordinate for each axis in a plurality of coordinate axes of a multi-dimensional coordinate space corresponding to an interactive content display area of the GUI, and
wherein the at least one data encoder includes a plurality of encoding networks for encoding the at least one vector, each encoding network encoding a sequence of coordinates for a corresponding axis in the plurality of coordinate axes.

4. The system of claim 2, wherein:
the at least one data encoder is a front-end encoder implemented in the application executable at the user device;
the at least one data decoder is a back-end decoding classifier implemented at a server communicatively coupled to the user device over a network;
the feature representation is transmitted from the front-end encoder to the back-end decoding classifier via the network; and
the determination of whether the sequence of movements for the at least one trajectory of the pointing device was produced by the actual user of the user device is based on a prediction received from the back-end decoding classifier via the network in response to the transmitted feature representation.

5. The system of claim 4, wherein the back-end decoding classifier is trained using training data mapped to labeled features of the feature representation generated by the front-end encoder.

6. The system of claim 4, wherein the application executable at the user device is a web browser, and wherein the back-end decoding classifier at the server is associated with a web service accessible via a corresponding website loaded within the web browser.

7. The system of claim 3, wherein the encoded features include a plurality of biometric features obtained from the tracked movement of the pointing device within the interactive content display area of the GUI over the consecutive time intervals.

8. The system of claim 7, wherein the plurality of biometric features include: an acceleration of the pointing device; an angle of the movement; a Euclidean norm of the set of coordinates along each axis of the multi-dimensional coordinate space; a curvature of the movement; a movement efficiency; a maximum time interval; and an absolute distance between the different locations of the pointing device.

9. A method comprising:
obtaining, by a server from an application executable at a user device via a network, a feature representation of movement data corresponding to different locations of a pointing device within a graphical user interface (GUI) of the application, the movement data including a set of coordinates and a timestamp for each of the different locations of the pointing device between consecutive time intervals;
extracting, by the server from the feature representation, a plurality of features representing a sequence of movements for at least one trajectory of the pointing device through one or more functional areas of the GUI and a duration the pointing device stays within each functional area;
predicting, by the server using at least one machine learning model and based on the plurality of features, a likelihood that the sequence of movements for the at least one trajectory of the pointing device was produced through human interaction with the pointing device by an actual user of the user device; and
transmitting the prediction from the server to the application at the user device via the network.

10. The method of claim 9, wherein the at least one machine learning model includes at least one data decoder, and the feature representation of the movement data was generated by at least one data encoder for the at least one data decoder to predict the likelihood that the sequence of movements for the at least one trajectory of the pointing device was produced by the actual user of the user device.

11. The method of claim 10, wherein the set of coordinates for each of the different locations of the pointing device includes a coordinate for each axis in a plurality of coordinate axes of a multi-dimensional coordinate space corresponding to an interactive content display area of the GUI, and
wherein the at least one data encoder includes a plurality of encoding networks for encoding the at least one vector, each encoding network encoding a sequence of coordinates for a corresponding axis in the plurality of coordinate axes.

12. The method of claim 10, wherein:
the at least one data encoder is a front-end encoder implemented in the application executable at the user device;
the at least one data decoder is a back-end decoding classifier implemented at a server communicatively coupled to the user device over a network;
the feature representation is transmitted from the front-end encoder to the back-end decoding classifier via the network; and
the determination of whether the sequence of movements for the at least one trajectory of the pointing device was produced by the actual user of the user device is based on a prediction received from the back-end decoding classifier via the network in response to the transmitted feature representation.

13. The method of claim 12, wherein the back-end decoding classifier is trained using training data mapped to labeled features of the feature representation generated by the front-end encoder.

14. The method of claim 12, wherein the application executable at the user device is a web browser, and wherein the back-end decoding classifier at the server is associated with a web service accessible via a corresponding website loaded within the web browser.

15. The method of claim 11, wherein the plurality of features includes a plurality of biometric features obtained from the tracked movement of the pointing device within the interactive content display area of the GUI over the consecutive time intervals.

16. The method of claim 15, wherein the plurality of biometric features include: an acceleration of the pointing device; an angle of the movement; a Euclidean norm of the set of coordinates along each axis of the multi-dimensional coordinate space; a curvature of the movement; a movement efficiency; a maximum time interval; and an absolute distance between the different locations of the pointing device.

17. A non-transitory machine-readable medium having stored thereon machine-readable instructions executable to cause a machine to perform operations comprising:
tracking, via a graphical user interface (GUI) of an application executable at a user device, a movement of a pointing device;
obtaining, based on the tracking, movement data associated with different locations of the pointing device within the GUI between consecutive time intervals, the movement data including a set of coordinates and a timestamp for each of the different locations of the pointing device between the consecutive time intervals;
mapping the movement data to functional areas corresponding to a range of the different locations of the pointing device within the GUI over the consecutive time intervals;
generating a feature representation of the mapped movement data for at least one trajectory of the pointing device through one or more of the functional areas and a duration the pointing device stays within each functional area; and determining, using at least one trained machine learning model and based on the generated feature representation, whether the at least one trajectory of the pointing device was produced by human interaction with the pointing device.

18. The non-transitory machine-readable medium of claim 17, wherein the feature representation includes at least one vector representing a sequence of movements for the at least one trajectory of the pointing device through the one or more of the functional areas.

19. The non-transitory machine-readable medium of claim 18, wherein the at least one trained machine learning model includes at least one data encoder and at least one data decoder, and wherein the operations further comprise:

generating, using the at least one data encoder, the feature representation of the at least one vector with encoded features to be decoded and used by the at least one data decoder for predicting a likelihood that the sequence of movements for the at least one trajectory of the pointing device was produced by human interaction with the pointing device.

20. The non-transitory machine-readable medium of claim 19, wherein the set of coordinates for each of the different locations of the pointing device includes a coordinate for each axis in a plurality of coordinate axes of a multi-dimensional coordinate space corresponding to an interactive content display area of the GUI, and wherein the at least one data encoder includes a plurality of encoding networks for encoding the at least one vector, each encoding network encoding a sequence of coordinates for a corresponding axis in the plurality of coordinate axes.

* * * * *